Dec. 29, 1942.   M. N. MORTENSEN   2,306,403
STRIPPING DEVICE
Filed June 7, 1941

Inventor:-
Magnus N. Mortensen
by his Attorneys
Howson & Howson

Patented Dec. 29, 1942

2,306,403

UNITED STATES PATENT OFFICE 2,306,403

STRIPPING DEVICE

Magnus N. Mortensen, Fairfax, Okla., assignor to North Bro's M'f'g Co., Philadelphia, Pa., a corporation of Pennsylvania Application June 7, 1941, Serial No. 397,115

1 Claim. (Cl. 81—9.5)

This invention relates to a device for stripping insulation from electric wires, and more particularly to a means, hereinafter described, for incorporating a device of this character in a suitable handle, which may, for example, be the handle of a screw driver or other tool.

One object of the invention is to provide a stripping device of the stated character incorporated in a handle in a manner to generally improve the functional characteristics of the device.

Another object of the invention is to provide a tool handle comprising a stripping device of the stated type, wherein said device is incorporated in the handle in a manner precluding interference thereby with manipulation of the tool in the normal manner.

A preferred embodiment of the invention is illustrated in the attached drawing, wherein Figure 1 is a side view of a screw driver having a handle incorporating a stripping device in accordance with my invention;

Figure 2:
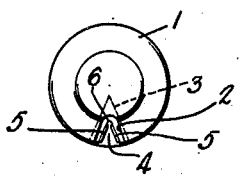
Fig. 2 is an outer end view of the handle.
Figure 1:
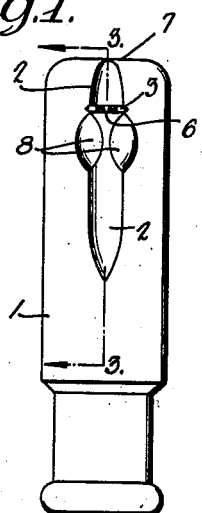

With reference to the drawing, the tool therein illustrated comprises a handle 1 which in accordance with the invention is provided with a groove 2. This groove is intersected by a metallic element 3 which is embedded in the handle and which in the present instance takes the form illustrated in Fig. 4. As therein shown, the element 3 is provided with a notch 4, the edges 5, 5 of which converge inwardly and terminate at their inner ends in a recess 6. The element 3 is arranged in the handle so that the converging edges 5 are exposed in the groove 2, said edges being relatively sharp to increase the functional efficiency of the device and lying in a plane which extends transversely of the groove. It will be noted that the element 3 is contained entirely within the outer contour of the handle, exclusive of the groove, so that there are no projecting portions which might injure the hand or interfere with the efficient manipulation of the tool in the normal manner. The groove 2 not only affords access to the stripping edges 5 of the element 3, but also guards the said edges against contact with the hand of the operator and with hard foreign objects which might tend to dull or mar the edges.

Figure 3:
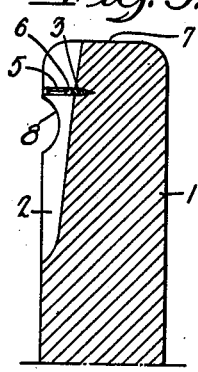
Fig. 3 is a section on the line 3—3, Fig. 1.

In the present instance, the groove 2 extends longitudinally of the handle and terminates in the outer end surface 7 of the latter. Preferably, although not essentially, the groove 2 increases in depth towards the said terminal end, as illustrated in Fig. 3; and preferably also the bottom of the groove is slightly convex in the longitudinal direction, as shown. On the side of the element 3 which is remote to the outer end, the handle is recessed, as indicated at 8, the said recesses having the effect of reducing the effective height of the walls of the groove 2. The function of these recesses will be hereinafter described.

Figure 5:
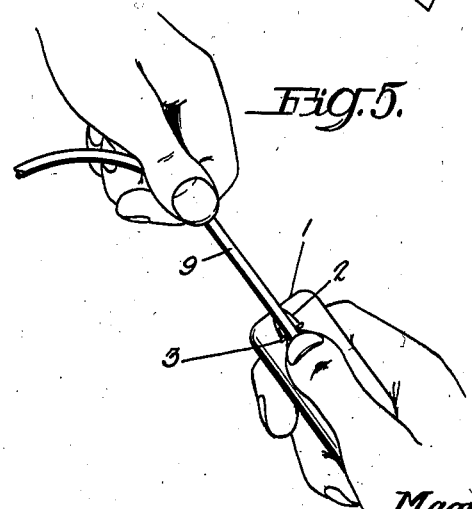
Fig. 5 is a view in perspective showing the manner in which the device is used in a stripping operation.

The manner in which the device is manipulated in a stripping operation is illustrated in Fig. 5. An end of the insulated wire 9 is laid in the groove 2 so that the insulation is wedged between the converging stripping edges 5 of the element 3. This wedging action is aided by the recess 8 which receives the thumb of the hand holding the tool, as shown. The recess also provides for snubbing the insulation in the bottom of the groove on the inner side of the element 3. The other hand of the operator grips the wire at a point beyond the outer end of the handle, and by a drawing action, the edges 5 are caused to rupture the insulation at the engaged point and to strip it from the end of the wire as the latter is drawn outwardly through the groove. The presence of the recess 6 at the inner ends of the converging edges 5 will be found to improve the functional efficiency of the device. The efficiency of the stripping device per se is also materially improved by its incorporation in the handle element, since the latter affords a solid and stable base for the element of a form ideally adapted to the hand.

Figure 4:
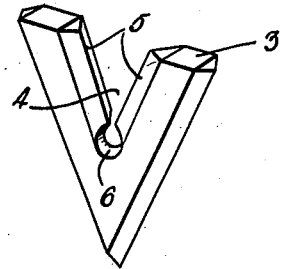
Fig. 4 is a view in perspective of the stripping element detached from the handle.
Figure 6:
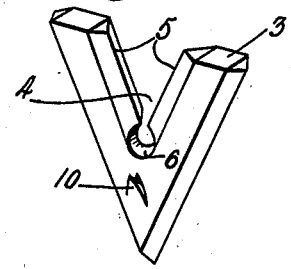
Fig. 6 is a view in perspective of a modified form of stripping element.

The form of the metallic element 3, as shown in Fig. 4, is well adapted for use in handles made of Celluloid, it being possible to drive the element forcibly into the body of the handle to the required embedded position without slotting or otherwise preparing the handle for reception of the element. When thus driven into place, the element is solidly held and shows no tendency to loosen, even after extended use. It is apparent, however, that the element 3 may be molded in the handle, where the latter is made of a moldable composition. Where the handle is composed of wood, the element 3 may be provided with one or more projecting tongues 10 (see Fig. 6) or equivalent formations in order to securely anchor the element in the handle. Since the major portion of the strain imposed upon the element in operation is generally inwardly of the handle, there is no material tendency for the element to become displaced.

It will be understood that the element 3 may take forms other than that herein illustrated, and that there may be other modifications in the form and arrangement of the various parts without departure from the essentially novel features of the invention as defined in the appended claims. It will be understood also that whereas the invention contemplates incorporation of the stripping device in the handle of a tool, such, for example, as a screw driver, and the mode of incorporation is designed to preclude interference with the normal manipulation of the tool as previously stated, the handle element which carries the stripping device may be entirely independent of other tools, the function of the handle being solely that of supporting the stripping device in a manner to afford a high degree of facility and efficiency in the use of that device.

I claim:

A handle having a longitudinal groove terminating at one end in a side surface and at the other end in an end surface of the handle and increasing in depth toward the latter end, a metallic element embedded in the handle entirely below the outer surface of the latter and having opposed inwardly converging edges intersecting and projecting from the opposite sides of said groove and in proximity to the last-named terminal end of the latter, and said handle having a transverse recess positioned entirely on the side of the metallic element remote to said end surface, said recess within its area materially reducing the effective height of the walls of said groove.

MAGNUS N. MORTENSEN.